United States Patent [19]
Overtoom et al.

[11] Patent Number: 5,835,785
[45] Date of Patent: Nov. 10, 1998

[54] MULTIPLEXED THREE LINE SYNCHRONOUS/FULL-DUPLEX ASYNCHRONOUS DATA BUS AND METHOD THEREFOR

[75] Inventors: Eric J. Overtoom, Grayslake; Manohar A. Joglekar, Long Grove, both of Ill.

[73] Assignee: Motorola, Inc., Schaumburg, Ill.

[21] Appl. No.: 338,993

[22] Filed: Nov. 14, 1994

[51] Int. Cl.$^6$ ........................................................ G06F 13/00
[52] U.S. Cl. ........................... 395/834; 395/881; 395/290
[58] Field of Search ....................................... 395/290, 285, 395/287, 550, 309; 370/85.11; 375/219, 370; 455/88, 73

[56] References Cited

U.S. PATENT DOCUMENTS

| | | |
|---|---|---|
| 4,654,655 | 3/1987 | Kowalski . |
| 4,803,481 | 2/1989 | Mueller et al. ....................... 340/825.5 |
| 4,972,432 | 11/1990 | Wilson et al. . |
| 5,150,359 | 9/1992 | Wilson et al. ........................ 370/85.11 |
| 5,175,820 | 12/1992 | Gephardt ................................ 395/834 |
| 5,214,774 | 5/1993 | Welsch et al. ......................... 455/11.1 |
| 5,267,263 | 11/1993 | Feezel et al. ........................... 375/220 |
| 5,280,623 | 1/1994 | Sodos et al. ............................ 395/325 |
| 5,561,821 | 10/1996 | Gephardt et al. ....................... 395/848 |
| 5,590,369 | 12/1996 | Burgess et al. ......................... 395/800 |

*Primary Examiner*—Thomas C. Lee
*Assistant Examiner*—Anderson I. Chen
*Attorney, Agent, or Firm*—Kevin D. Kaschke

[57] ABSTRACT

A multiplexed synchronous/asynchronous data bus uses three communications lines (T, C, R) to convey bi-directional synchronous data between two data devices at a relatively low data transfer rate. The data bus is configured as a full-duplex asynchronous data bus by communicating a false address between the two data devices on two communications lines (T, C) using the synchronous data bus, holding the two communications lines (T, C) in a logic high state for a period of time, and continuing to hold one of the two communications lines (C) in the logic high state during full-duplex asynchronous communication. Full-duplex asynchronous data can then communicated between the two data devices at a higher data transfer rate on two of the three communications lines (T, R).

32 Claims, 7 Drawing Sheets

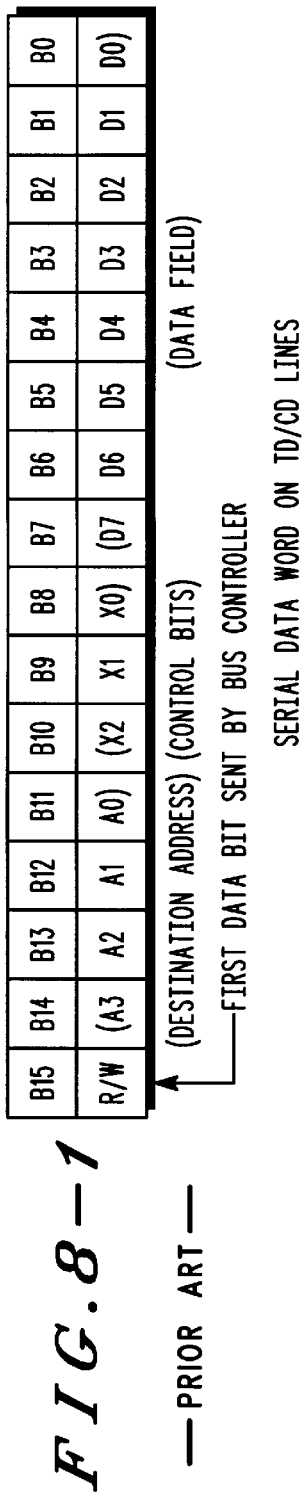
FIG.8-1 — PRIOR ART —
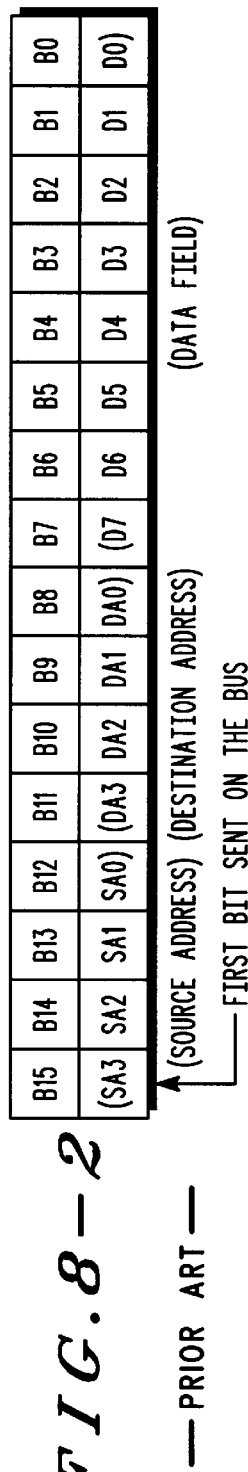
FIG.8-2 — PRIOR ART —
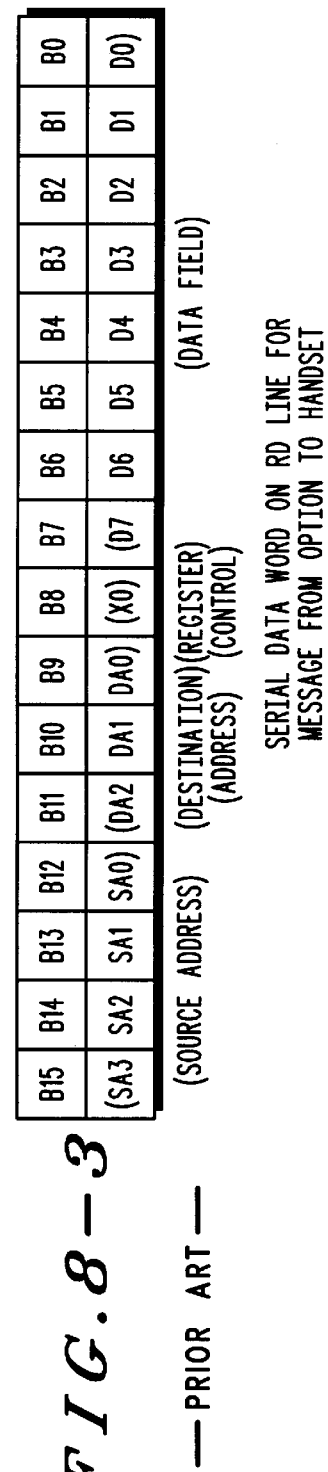
FIG.8-3 — PRIOR ART —

SLAVE OPERATION

5,835,785

MULTIPLEXED THREE LINE SYNCHRONOUS/FULL-DUPLEX ASYNCHRONOUS DATA BUS AND METHOD THEREFOR

FIELD OF THE INVENTION

The present invention relates generally to data transmission systems and more particularly to a multiplexed synchronous/asynchronous data bus and method therefor.

BACKGROUND OF THE INVENTION

A synchronous self-clocking digital data transmission system has been described in U.S. Pat. No. 4,369,516 to Byrns. This system provides a synchronous, self-clocking, bi-directional data transmission bus which is immune to speed and timing variations and suited for data bus structures of long length. The use by a data transmitter of two bit binary states of two data signal lines enables the unique definition of the beginning and end of a data signal and the binary states of the bits of a data signal while also differentiating between addresses and data signals. A third data signal line is used by peripheral devices to return communications to the data transmitter. As implemented in some mobile and portable radiotelephone equipment currently available for cellular radiotelephone systems, the synchronous self-clocking data bus is operated at relatively low data rates. The inherent capabilities of the bus and its data rate allow operation in areas of high electrical noise (e.g. an automobile) and produces little electromagnetic interference itself.

Asynchronous serial data transmission systems are well known in the art and offer high rates of data transfer. For example, the MC68HC11A8 microprocessor utilizes a serial communications interface (SCI) whereby the microprocessor may communicate with peripheral devices using in a standard NRZ (mark/space) format on both a receive data input port (RXD) and a transmit data output port (TXD). The MC68HC11A8 serial communications interface is further described in the HMOS Single Chip Microcomputer Data Book, order number ADI1207R1, 1987, pp. 5–1 to 5—5.

In order to realize the features of both types of data transmission systems in the subscriber equipment of cellular radiotelephone systems, it would be necessary to incorporate both on a common physical bus structure in order to reduce the number of lines and connectors. The size of the physical bus is particularly important in portable radiotelephone equipment. It is also desirable that the self-clocking synchronous bus in current use continue in use unmodified without retrofitting equipment already in service. This desire is in conflict with the increasing necessity of exchanging data at higher transmission rates.

It would be desirable therefore, to combine the immunity to speed variations, timing variations, and long physical bus length of the present low data transfer rate synchronous data bus with the increased data transfer rate of the asynchronous data bus. Since in many applications the number of bus lines and corresponding connectors is an important consideration, it would also be desirable to maintain the number of signal lines in a combined bus structure.

SUMMARY OF THE INVENTION

Accordingly, the foregoing need is substantially met by a multiplexed synchronous/asychronous data bus and method therefor. A master device and method therefor employs a data transmission bus including three communications lines for transmitting a first data message from the master data device to a slave data device at a first rate of data transfer, and for transmitting a second data message from the master data device to the slave data device at a second rate of data transfer. Each of the two data messages has a plurality of binary bits. Each bit has either a binary zero state or a binary one state for a period of time which is related to the data transfer rate. The master device comprises a data bus controller for applying a first binary state to a first and a second of the three communications lines before and after the first data message; for coupling the first data message to the first and second of the three communications lines; coupling a false address of the first data message to the first and the second of the three communications lines; for applying a second binary state to the first and the second of the three communications lines after the false address is coupled to the first and the second of the three communications lines; and for applying the binary bits of the second data message to the second of the three communications lines while the second binary state is applied to the first of the three communications lines.

The slave device and method therefor employs a data transmission bus including three communications lines for receiving a first data message transmitted from the master data device at a first rate of data transfer, for receiving a second data message transmitted from the master data device at a second rate of data transfer, and for communicating a third data message to the master data device. Each of the three data messages has a plurality of binary bits. Each bit has either a binary zero state or a binary one state for a period of time which is related to the data transfer rate. The slave device comprises a data bus controller for receiving a first binary state from a first and a second of the three communications lines before and after the first data message; for receiving the first data message from the first and second of the three communications lines; for coupling at the first rate of data transfer the binary bits of the third data message to a third of the three communications lines; for receiving a false address of the first data message from the first and the second of the three communications lines; for receiving a second binary state from the first and the second of the three communications lines after the false address is received from the first and the second of the three communications lines; and for receiving the binary bits of the second data message from the second of the three communications lines while the second binary state is received from the first of the three communications lines.

BRIEF DESCRIPTION OF THE DRAWINGS

FIGS. 8-1, 8-2 and 8-3 illustrate the signaling scheme which unifies the operation of the control unit, the control head, and peripherals which communicate on the data bus in accordance with the present invention.

DETAILED DESCRIPTION OF THE PREFERRED EMBODIMENT

One application which may advantageously employ the present invention is that of a portable radiotelephone in which a minimum number of data bus lines and associated connectors aids in the miniaturization of the radiotelephone equipment. Although the invention is described with portable radiotelephones as the preferred embodiment, the invention may just as well be employed in other applications having similar requirements or requirements necessitating interconnection with equipment employing the present invention.

Radiotelephones provide the same type of fully automatic telephone service to a mobile or portable user that is provided to a conventional land line subscriber. In a cellular radiotelephone system, service is provided over a wide geographic area by dividing the area into a number of cells. Each cell typically has a base station which provides a signaling radio channel and a number of voice radio channels. Telephone calls are placed to, and originated by, radiotelephones over the signaling channel in each of the cells. Upon completion of the signaling, the radiotelephone is assigned a voice channel to which it switches form the signaling channel for the duration of the call. In the event that a radiotelephone leaves the cell and enters another cell, the radiotelephone is automatically switched over, or handed off, to an available voice channel in the new cell.

The present invention has been designed to operate in the portable radiotelephone units of a cellular system, although it could be used in any automatic radiotelephone system. The portable unit may be one such as that marketed by Motorola, Inc. as sales model F09FGD8453AA or generally of the type described in U.S. Pat. No. 3,906,166 "Radio Telephone System" by Cooper et al. and U.S. Pat. No. 3,962,553 "Portable Telephone System Having a Battery Saver Feature" by Linder et al.

Figure 1:
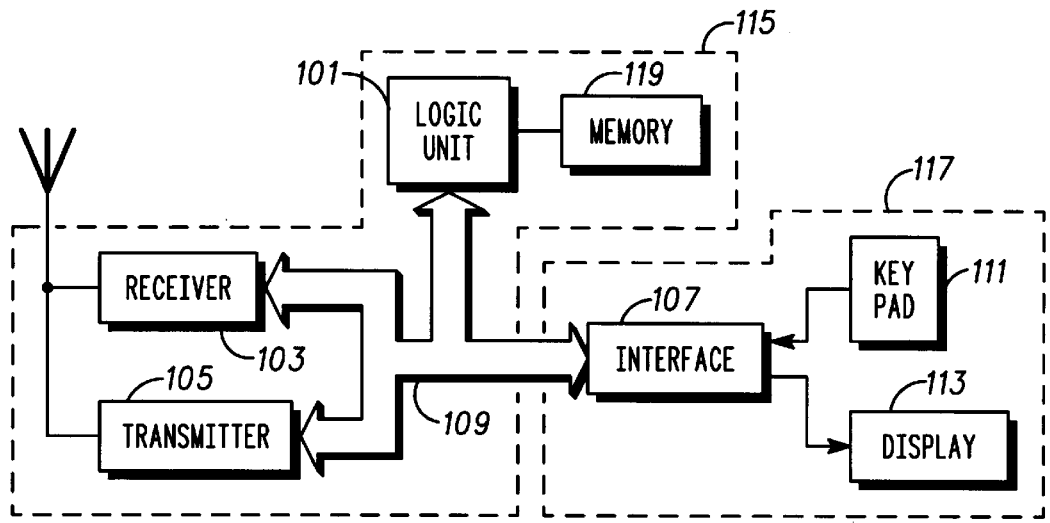
FIG. 1 is a block diagram of a known portable radiotelephone which may employ the present invention.

In order to accommodate the signaling and control functions in an automatic radiotelephone system, a microprocessor, memory, and related peripheral devices are employed in a logic unit for control of the portable radiotelephone. This logic unit may be configured such that the signaling received from the base station or transmitted to the based station is handled on a high speed interrupt basis while control signals for the radio unit, including keypad and display, are handled on a lower speed basis by way of a separate serial data bus. Such a microprocessor control system is further described in U.S. Pat. No. 4,434,461 "Microprocessor with Duplicate Registers for Processing Interrupts" by Puhl. Alternately, all data communication between the logic unit, the portable transceiver and the integral keypad and display may be handled on a high speed serial data bus as shown in FIG. 1. In FIG. 1, a conventional logic unit 101 is connected to the receiver 103 and the transmitter 105 and in interface 107 via a self-clocking serial data bus 109. The receiver 103, transmitter 105, and logic unit 101 with its associated memory 119 may be physically grouped together as a radio unit 115. The interface 107 and telephone keypad 111 and user character display 113 may be a separate control unit 117 (as in a mobile radiotelephone configuration) or it may be fully integrated into one package (as in a portable radiotelephone). The self-clocking nature of the serial data bus 109 enables the interface 107 to be remotely located from the logic unit 101.

Figure 2:
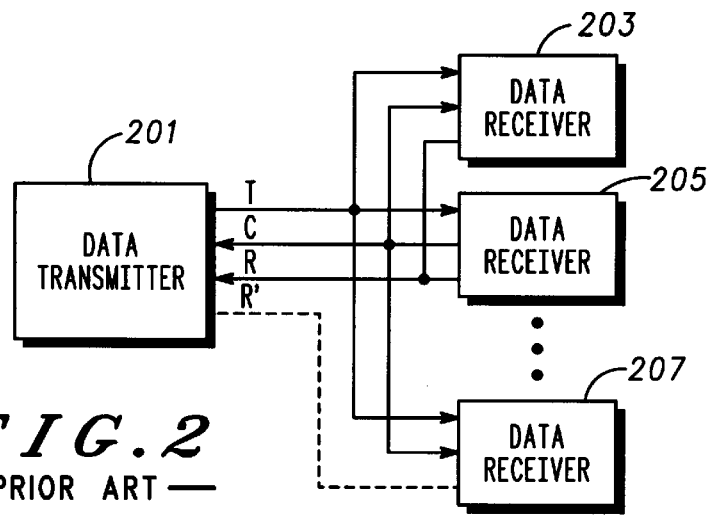
FIG. 2 is a block diagram of a known generalized data communication system which may be useful in employing the present invention.

The serial data bus may be briefly described in conjunction with FIG. 2. A more detailed description of this data bus is found in U.S. Pat. No. 4,369,516, by Byrns. A general data transmitter 201 is coupled to data receivers 203, 205, and 207 by two signal lines, labeled T (true data) and C (compliment data). The data receivers 203 and 205 may also transmit return data signals to the data transmitter by means of a shared signal line labeled R (return data). A separate return data line (R') may also be used to transmit return data signals to the data transmitter as shown for data receiver 207. The return data signals transmitted by the data receivers 203, 205, and 207 on the return data signal lines are transmitted in synchronism with the data signals received from the data transmitter 201 on the true data and complement data signal lines.

If the general bidirectional bus concept of FIG. 2 is applied to the control circuitry of a portable radiotelephone, the data transmitter becomes the logic unit and the data receivers become the transmitter, receiver, user interface, and other devices sharing the bus.

The format taken by the data transmitted by the data transmitter 201 to the data receivers 203, 205, and 207 makes use of the four two-bit binary states which can be assumed by the true data and complement data signal lines taken together. For example, referring to the state diagram of FIG. 3, a first two-bit binary state may be referred to as a "reset" state 301, where the true data signal line has a binary zero value and the complement date signal line also has a binary zero value. When no data is being transmitted, the reset state 301 is provided on the true data and complement data signal lines. When a data signal is to be transmitted, a transition is made form the reset state 301 to either a "zero" state 303 or a "one" state 305 corresponding to a zero or a one in the input data to be transmitted. In the zero state 303, the true data line assumes a zero binary value and the complement data line assumes a one binary value and the complement data line assumes a binary zero value. Following the one state 305 or the zero state 303, the serial data bus assumes an "idle" state 307 in which both the true data line and the complement data line assume a one binary value. A transition is then made from the idle state 307 to either the one state 305 or the zero state 303. For all succeeding bits of the data signal to be transmitted, a transition is made to the idle state 307 before a transition to the one state 305 or the zero state 303. This can be seen in FIG. 4.

Figure 3:
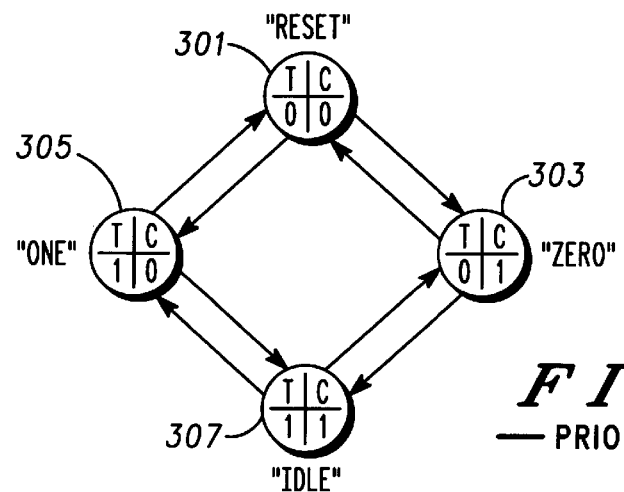
FIG. 3 is a state diagram for a known method of communicating data in the system of FIG. 2.
Figure 4:
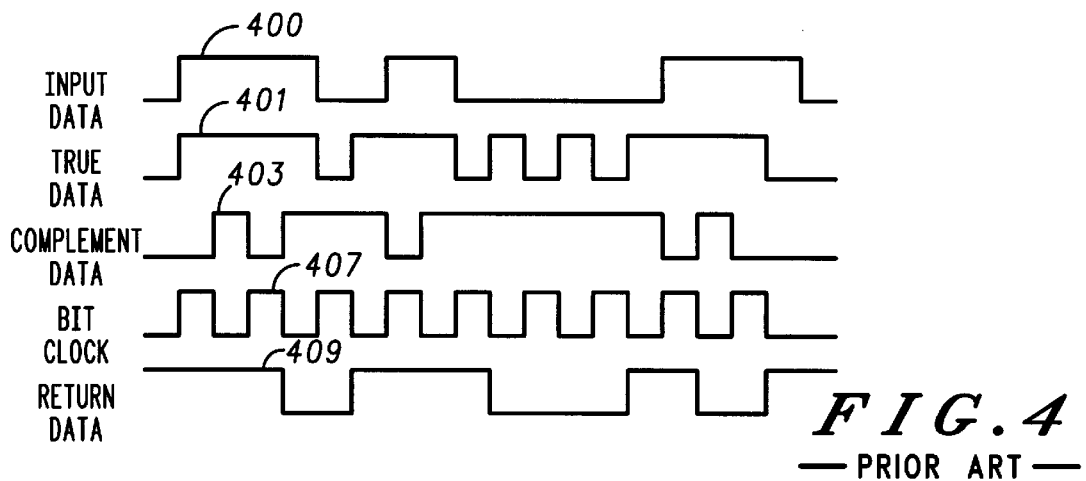
FIG. 4 is a timing diagram showing the relationship between the input data and the data transmitted over the system of FIG. 2.

Transitions between the states in FIG. 4 are selected such that only one signal line is changing binary value during each transition. Transitions between the reset state 301 and the idle state 307 and between the one state 305 and the zero state 303 are not allowed since they would require that the value of both the true and the complement data signal lines change simultaneously. This limiting of transitions between the binary states minimizes the effects of skewing and timing variations. Moreover, by transmitting data signals as illustrated in the state diagram of FIG. 3, the transmission on the true data and complement data signal lines is both self-clocking and independent of the transmitting frequency. The time duration between each of the state transitions need not be the same and may vary dynamically thereby enabling the frequency of the data transmission to be entirely asynchronous with randomly varying time intervals between successive state transitions.

Understanding of the synchronous data format may be enhanced by referring to FIG. 4. For transmission of a data signal, two state transitions occur for each input data bit shown in input data stream 400. For the first bit of the transmitted data signal, a transition is made from the reset state 301 to the one state 305 resulting in the true data signal line attaining a binary one as shown at 401. Next, a state transition is made to the idle state 307 resulting in the complement data signal line attaining a binary one value at 403. Then, for each succeeding bit of the data signal, a transition is made the one state 305 or the zero state 303 and then back to the idle state 307 for each bit of the data input signal to be transmitted, the received idle state 307 can be utilized at the data receivers to generate a bit clock signal 407. For the last bit of the data signal, the last state transition is made from the one state 305 or the zero state 303 to the reset state 301. Returning to the reset state 301 after the last bit of the data signal has been transmitted indicates to the data receivers 203, 205, and 207 that a complete data signal has been transmitted.

Figure 5:
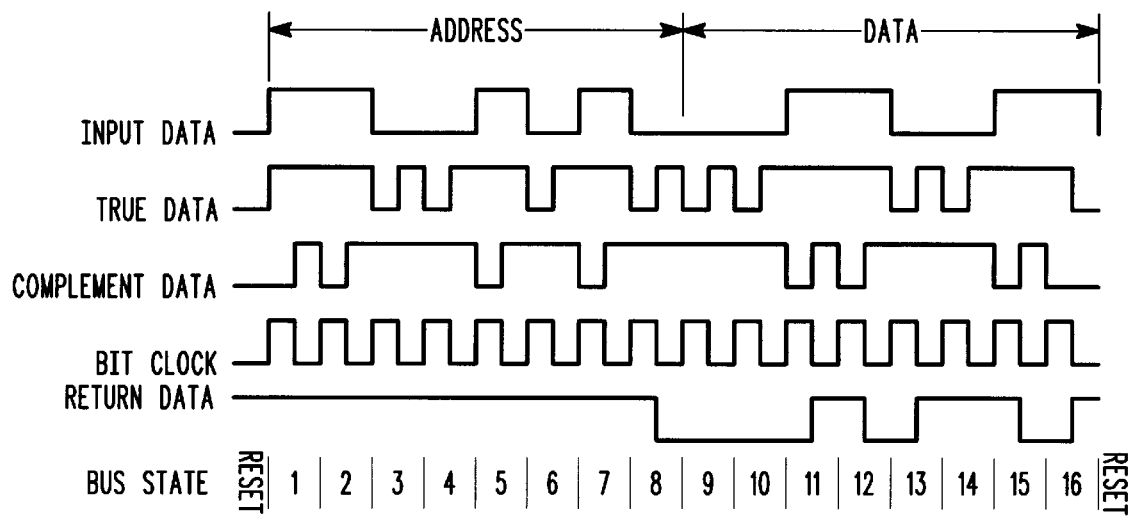
FIG. 5 is a timing diagram showing information and addressing data which may be transmitted over the system of FIG. 2 and may be used to select a particular data receiver for the information.

In order to provide for the bidirectional transmission of data signals between the data transmitter 201 and the data receivers 203, 205, and 207, another signal line referred to as the return data signal line 409 is provided for carrying data signals from the data receivers 203, 205, and 207. The data receivers can transmit a return data signal on the return data signal line by utilizing the bit clock signal 407 developed by detecting the bit value of the true data and complement data signal lines. As previously described, separate return data signal lines can be provided to each data receiver as for data receiver 207, or a number of data receivers such as data receivers 203 and 205 can be connected to one return data signal line. If a number of data receivers are connected to the same return data signal line, it becomes necessary to selectively address the particular data receiver that is to transmit a return data signal. Many different addressing schemes may be utilized and one such addressing scheme, which utilizes a portion of the data signal transmitted by the data transmitter to provide an address, is shown in FIG. 5. The number of bits dedicated to the address function determines the maximum number of data receivers which can be uniquely addressed. It has been shown in U.S. Pat. No. 4,390,963, "Interface Adaptor Architecture" by Publ, et al. that the true data and complement date signal lines may be dynamically interchanged and an additional number of unique addresses may be obtained.

A serial asynchronous bus which may be utilized in the present invention is that which may be employed as the Serial Communication Interface (SCI) for the MC68HC11 family of 8-bit microprocessors (or their equivalents). Such an asynchronous bus is characterized by a standard NRZ format (one start bit, eight or nine data bits, and one stop bit) and meets the following criteria:

1) The idle line is brought to a logic one state prior to transmission/reception of a character.

2) A start bit (logic zero) is used to indicate the start of a frame.

3) The data is transmitted and received least-significant-bit first.

4) A stop bit (logic one) is used to indicate the end of a frame. A frame consists of a start bit, a character of eight or nine data bits, and a stop bit.

5) A break is defined as the transmission or reception of a low (logic zero) for at least one complete frame time.

Figure 6:
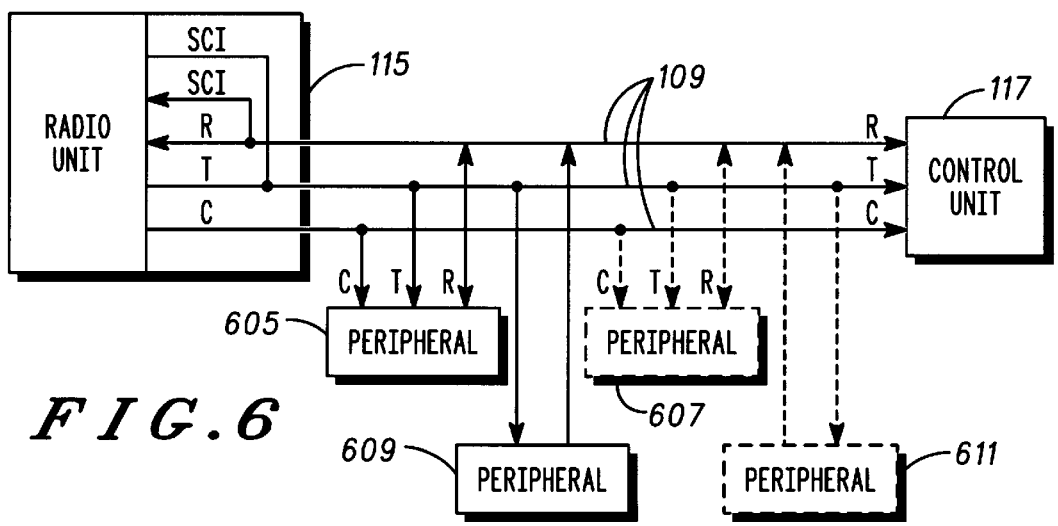
FIG. 6 is a simplified block diagram of a radiotelephone remote unit having a three wire bus structure with multiplexing capability.

It is an important feature of the present invention that the faster asynchronous SCI bus is layered over the top of the synchronous bus. This enables backwards compatibility with equipment which may utilize only the synchronous bus while increasing the rate of data transfer. In a portable radiotelephone with integral radio unit and control unit (generically called a remote unit), the T (true data) and C (complement data) lines are unidirectional lines that go between the logic unit 101 of the radio unit 115 and the interface of the control unit 117 and from the radio unit 115 to external or other internal peripherals. The third line is the bi-directional R (return) line, it is used by the control unit 117 and peripherals to talk to the radio unit 115 logic unit 101 as well as other devices on the bus. Data is passed down the bus, with T and C setting up the timing. It is a synchronous bus. In the preferred embodiment, a high speed asynchronous data bus is configured on the T and R data lines of the synchronous self-clocking data bus (called herein a three-wire bus, or TWB). The high speed asynchronous bus (SCI-Serial Communication Interface) (conventionally 9600 bps) runs at over 30 times the speed of the TWB (conventionally 300 bps) and, through software control, can share the same data line. The SCI employed in the present in the present invention is a dual line full-duplex bus. All devices that communicate on this bus write to the R data line receive data from the T data line. FIG. 6 shows the configuration of the two multiplexed buses.

As shown, the TWB of T, C, and R lines are coupled from the radio unit 115 to the control unit 117. In a portable radiotelephone remote unit the radio unit 115 and the control unit 117 are physically located in the same housing. Peripheral 605 which is also coupled to the T, C, and R lines can receive data from the TWB as well as send data to other peripherals 607 (if any), as well as the remote unit 601 and the control unit 603. Such peripherals may be scramblers, data devices such as modems, for example, or additional handsets and may be internal or external to the portable radiotelephone remote unit. Another example of a peripheral is described in U.S. Pat. No. 4,680,787 "Portable Radiotelephone Vehicular Converter and Remote Handset" to Marry, which is a vehicle-mounted converter which can provide external power, an external antenna, radio-frequency (RF) amplification for the receiver and transmitter of a portable remote unit, and other features which may not be available on the portable radiotelephone.

When the portable radiotelephone is placed in the converter, it is desirable that an automatic integration of all logic functions occur. Initially, the portable radiotelephone logic unit 101 must verify that it has been connected to the converter peripheral 605. Once this is accomplished, functions which originally were part of the portable radiotelephone may be transferred to the converter peripheral 605. This transfer of functions conventionally has been a data exchange on the TWB. However, in some instances the transfer may require too much time to complete. For example, in virtually every cellular radiotelephone system, each individual remote unit, portable or mobile, has one or more unique associated information sets, one of which includes NAM data (e.g., phone number, system ID, system channel scan data and serial number). The phone number in the NAM data is used by the cellular radiotelephone systems to identify the remote unit using the system. Since it is useful for the system user to have a portable radiotelephone and a vehicle mounted converter peripheral, it is economically advantageous to have the converter peripheral contain most, if not all, of the functions of a mobile radiotelephone and be endowed with the capability of assuming the identity of the portable radiotelephone as defined in the aforementioned NAM data. A process of transferring identity is described in U.S. patent application No. 107,227 "Radio Arrangement Having Two Radios Sharing Circuitry" filed on Oct. 9, 1987 in behalf of Metroka. NAM data transfer communication between the converter peripheral and the portable radiotelephone includes data transfer between microprocessors resident in the converter peripheral and the portable radiotelephone logic unit 101.

The portable radiotelephone must download its NAM, serial number and telephone number repertory memory into the converter peripheral in order for the system to work without annoying delays to the user. When the TWB is used, a delay is encountered due to the slow rate of data transfer of the TWB. Further, the use of the TWB alone limits the versatility of the portable converter system because the converter peripheral, in order to keep user-feature continuity between the operation of the portable radiotelephone alone and the operation of the radiotelephone when the portable is plugged into the converter, must have software that has the same user features as the portable. As the portable's functions change in response to market requirements, the converter peripheral functions must also be updated. The higher speed asynchronous data bus allows the necessary data transfer.

The present invention multiplexes the dual-line (T and R data lines) asynchronous serial bus with the T and R data lines of the synchronous TWB. Both the TWB and the SCI devices can share the same bus lines without conflict. The equipment remains backwards compatible, while still increasing the effective data transfer rate of the bus.

The interconnection of a high speed peripheral interconnection with the multiplexed synchronous/asynchronous data bus of the present invention is illustrated by the connection of peripheral 609 to the T and R data lines of the TWB. The multiplexed data bus may accommodate a plurality of peripherals (607, 611). It is also likely that a peripheral will have the capability of accessing both the parallel TWB and the high speed serial bus. The converter peripheral of the preferred embodiment is such a peripheral.

The present invention may also be advantageously utilized in a high speed data modem as the peripheral using a signaling scheme well known as Cellular Digital Packet Data (CDPD). Specifications for the operation of CDPD in general is found in the CDPD Specification, release 1.0, books 1–6. In particular, CDPD Specification, release 1.0, book 3, volume 4, discusses an air link interface to couple data signals between the modem and the radiotelephone. The synchronous TWB cannot meet the high speed data requirements of the CDPD specification. According to the present invention, however, the high speed data requirement of the CDPD specification is met using the asychronous data bus configuration discussed herein below.

Figure 7:
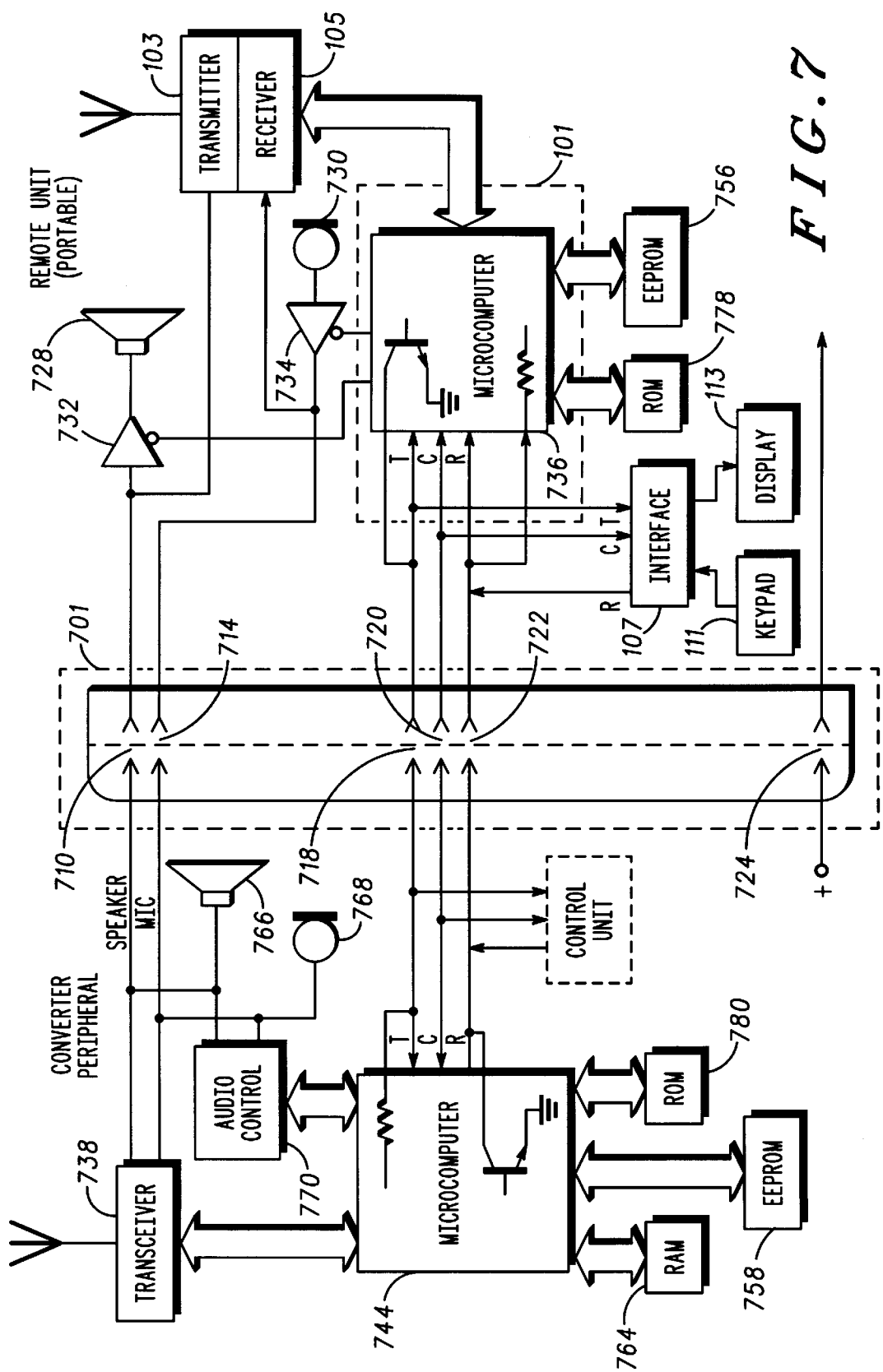
FIG. 7 is a block diagram of a portable radiotelephone remote unit and a converter peripheral which may employ the present invention.

Referring now to FIG. 7, a remote unit is shown in detail coupled to a converter peripheral. As described previously, a portable radiotelephone user may insert a portable radiotelephone into a vehicular-mounted converter for external power, external antenna, RF amplification, and other features. A connector interface 701 is illustrated in FIG. 7 which connects audio connections 710 and 714, TWB lines 718, 720, and 722, and power connection 724. Other connections, of course, may be made as necessary.

Connections 710 and 714 are audio connections which allow the portable to act as a handset, while the portable and converter are intercoupled. A speaker 728 and a microphone 730, conventional in portables, are coupled to the audio connections 710 and 714 through mute gates 732 and 734 to provide this function. The mute gates may be controlled by microcomputers 736 and 107 as is conventionally provided in stand alone portables or mobiles. See, for example, Motorola Instruction Manual Nos. 68P81070E40 and 68P81046E60, entitled "DYNA TAC Cellular Mobile Telephone Instruction Manual" and "DYNA TAC Cellular Portable Telephone Instruction Manual" respectively. Both manuals are available from Motorola C & E Parts, 1313 Algonquin Road, Schaumburg, Ill., 60196, U.S.A. Microcomputers 736 and 744 may be conventional microprocessors such as MC68HC11A8 or equivalent devices.

The converter peripheral of the preferred embodiment may contain a complete radio transceiver 738, as described in aforementioned U.S. patent application No. 107,227, in which case the portable radiotelephone transmitter 103 and receiver 105 are deactivated during the time the portable is coupled to the converter peripheral. The converter peripheral, in effect, takes on the identity of the portable radiotelephone during the period of coupling and is operated by the user as though it were a conventional mobile radiotelephone.

Upon the portable radiotelephone being plugged into the converter peripheral, an exchange of data occurs on the multiplexed synchronous/asynchronous data bus of the present invention whereby the NAM information stored in the portable memory EEPROM 756 is downloaded via microcomputer 744 into RAM 364. Such a data transfer allows the converter peripheral to assume the portable's identity for subsequent communication on the cellular system. Additional portable functions, such as repertory dialing telephone numbers, may also be downloaded into converter peripheral memory EEPROM 758. Likewise, control of audio transducers 766 and 768 may be relinquished to microcomputer 744 and audio control 770.

The amount of data to be exchanged is, therefore, a sizable amount and would require a relatively long time to transfer at the 300 bps rate of the conventional TWB. The multiplexing of the present invention allows a much higher rate of data transfer by placing the TWB in an in-use state (thereby preventing the interface 107 of the portable radiotelephone, for example, from accessing and applying data to the TWB) and transferring the identifying data from the portable radiotelephone on the serial data bus of the R line. To accomplish this the T, C and R data lines are coupled between the microcomputer 736 and 744 as shown. The microcomputer 736 and the microcomputer 744 communicate bidirectional synchronous data on the T, C, and R data lines. When the data transmission bus is configured as an asynchronous data bus, the microcomputer 736 and microcomputer 744 communicate SCI data using the alternate T and R data line ports.

FIGS. 8-1 through 8-3 show the signaling scheme which unifies the operation of the logic unit, the control head, and a number of peripheral units which communicate on the data bus of the present invention. The signaling scheme presented is discussed in further detail in U.S. Pat. No. 4,654,655 by Kowalski (herein incorporated by reference). According to the principles of the present invention, data placed on the serial bus lines is organized in groups of sixteen bits. When data is to be communicated on the bus, the T and C lines provide clocking information as well as a data path which communicates data from the bus controller to the various handsets or peripheral devices. Each of the devices which utilize the serial data bus are assigned a four bit address which also corresponds to a predetermined priority for that unit. The priority assignments are used to determine which unit will get service on the bus if several handsets of peripheral devices request service simultaneously. It should be noted that the signaling scheme of the present invention does not require continuous clocking on the serial data bus and the signaling scheme here described is not data rate dependent. Since clocking information is directly derived from the data present on the T and C lines, the bus control unit can variably alter the data rate during data communications if desired. The bus control unit is assigned an address which corresponds to the highest priority unit on the bus. The primary handset used on the bus is assigned the next highest priority. The bus addresses are organized in groups so that any handset on the bus will have a higher priority than any peripheral device on the bus. The preferred address assignments used in accordance with the preferred embodiment of the present table are shown below in Table 1.

TABLE 1

| Address | Unit | Priority |
|---------|------|----------|
| 0000 | Controller | Highest |
| 0001 | Handset #1 | |
| . | | |
| . | | |
| . | | |
| 0110 | Handset #6 | |
| 0111 | Handset All | Call |
| 1000 | Option #1 | |
| . | | |
| . | | |
| . | | |
| 1111 | Option #8 | Lowest |

Referring now to FIG. 8-1, there is shown the signaling format for a sixteen bit data packet which would be communicated from the bus controller to the handsets or peripheral devices using the T and C lines of the serial data bus. According to FIG. 8-1 the first bit (B15) of the data packet comprises a read/write bit which indicates that the bus controller is ready to either send data to or answer a request for service from the handsets and peripheral devices. The next four bits (B14-B11), referred to as destination bits, indicate the address of the unit which is to communicate with the bus controller. The destination bits are followed by three control bits (B10-B8) which indicate a register within the handset or peripheral which will be accessed by the bus controller. The registers within a handset or peripheral may contain such information as a desired phone number, frequency or channel information or other such information. The control bits are followed by eight data bits (B7-B0) which are to be communicated between devices.

FIG. 8-2 shows the signaling format for the serial data bus line R when information is to be communicated from a handset or peripheral device to the bus control unit. When information is to be sent from a handset or peripheral device to the bus control unit, the serial bus lines T and C toggle between data states 305 or 303 and idle state 307 in FIG. 3 to provide clocking information to the handset or peripheral device sending data. The T and C lines will continue to toggle for the duration of the sixteen bit message. When the sixteen bit message has bee completed, the T and C lines will revert to the reset state 301 until another handset or peripheral device requests service on the bus. Referring now to FIG. 8-2 there is shown the signaling scheme used to communicated information on the R line from a handset or peripheral device to the bus controller or between peripheral units. The first four bits of the sixteen bit data packet (B15-B11) comprises the addressed (referred to as the source address) of the device requesting service on the bus. The source address serves two purposes. The source address identifies the device requesting service of the bus as well as providing the means for arbitration if two units request service of the bus simultaneously. The source address bits are followed by a four bit address (B11-B8), referred to as the destination address, which indicate the device intended to receive the following data field. The next eight bits (B7-B0) comprise the data field, which is to be communicated between devices.

Referring now to FIG. 8-3 there is shown an alternate signaling format which could be used to communicate information on the bus from a peripheral device to a handset. According to FIG. 8-3 the first four bits (B15-B11) comprise the source address of the data to be placed on the bus. The source address bits are followed by a three bit destination address (B11–B9) and a one bit register control B8. Since this signaling stream is used for communication between a peripheral device and a handset, a four bit destination address is not required, and therefore, a single bit (B8) is reserved to select a destination register within a handset. The destination bits and register control bits are then followed by an eight bit data field (B7–B0) comprising the data to be communicated from the peripheral to the handset. As mentioned earlier, whenever a data packet has been communicated on the bus, the bus conductors T, C, and R will return to an idle state until service is again required on the bus.

Figure 9:
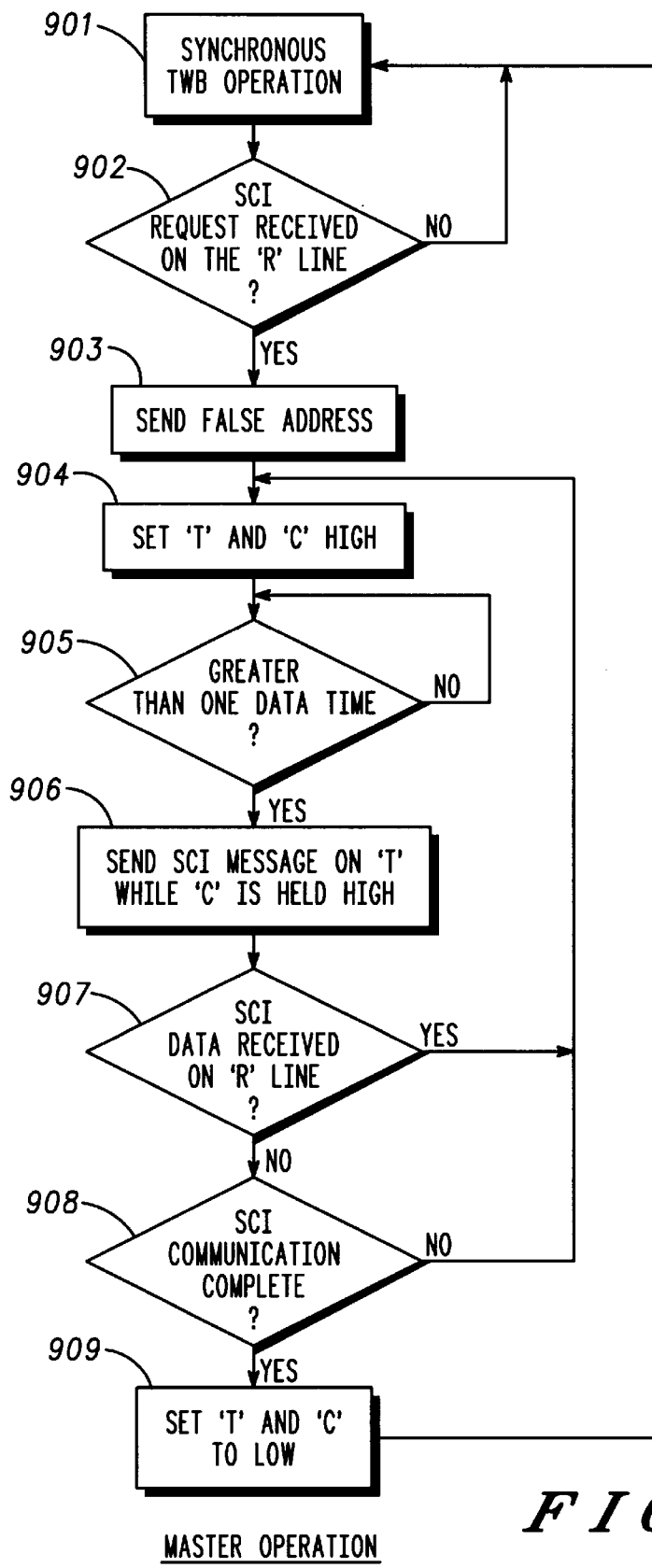
FIG. 9 is a flowchart of the process of multiplexing asynchronous data with the synchronous data as employed in the present invention.

The method exercised by microcomputer 736 (as stored in memory ROM 778) to control the multiplexed synchronous/asynchronous data bus of the present invention is shown in the flow chart of FIG. 9. Under most operating conditions, the TWB mode is in synchronous operation at step 901 and data is exchanged as described previously on the T, C, and R lines. When an exchange of a substantial amount of data must occur as detected at step 902, such as when a portable radiotelephone remote unit is placed in a converter, the portable detects a change in power source and processes an initial power-up sequence. If no request for SCI asynchronous communication occurs, the flow routes back to step 901 to continue normal TWB operation. At step 903, the radiotelephone sends a false address message to the converter to cause the converter not to listen to the synchronous data bus any longer. At step 904, the radiotelephone sets the T and C data lines high (the idle state) so that the converter will not request service on the synchronous data bus. At step 905, the process then waits for a period of time greater than one normal TWB data bit before commencing the transmission of an SCI asynchronous message. The asynchronous bus is now configured for high speed data use without interference from any peripheral on the synchronous data bus. At step 906 the radiotelephone sends to the converter an SCI message on the T data line while the C data line is held in a logic high state. Maintaining the C data line is held in a logic high state keeps the data bus in the asynchronous data bus configuration. At step 907, the radiotelephone checks to see if any SCI data is received on the asynchronous data bus. If the determination is positive, the flow returns to step 904 thereby placing the data bus in the idle state. If the determination is negative, the radiotelephone determines if the SCI communication is complete. If the determination is negative, the flow returns to step 904 thereby placing the data bus in the idle state. If the determination is negative, the flow continues to step 909 wherein the T and C data lines are set to a logic low state thereby placing the data bus in a reset state. The placement of the logic low on the T and C data lines returns the data bus to normal TWB operation at step 901.

Figure 10:
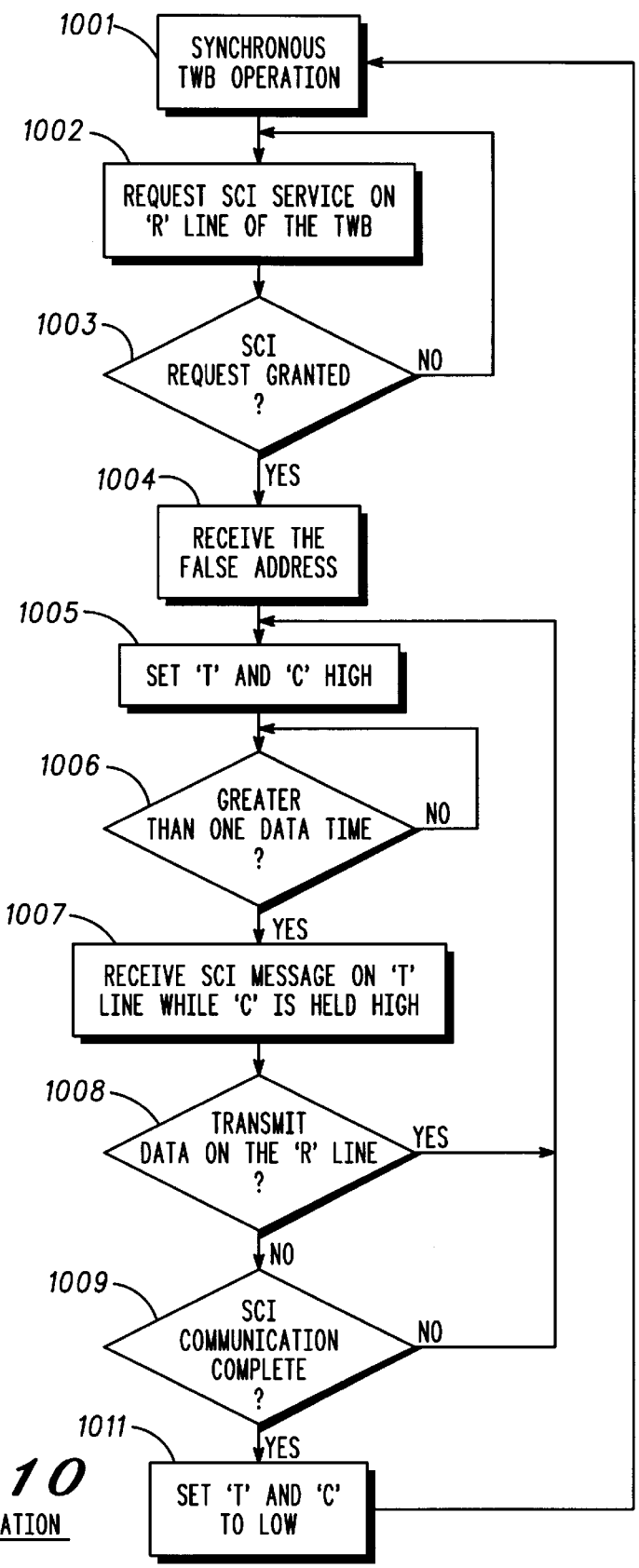
FIG. 10 is a flowchart of the response of a slave unit to the transmission of asynchronous data shown in the flowchart of FIG. 9.

The response of the portable radiotelephone to high speed data upon the return of power after the portable is plugged into the converter is shown in FIG. 10. At this point in time, the portable is considered the slave unit. At step 1001 the TWB operates as a synchronous data bus. At step 1002 the peripheral requests SCI communication on the R data line of the TWB. At step 1003, if the SCI request is not granted by the radiotelephone, the flow returns to step 1002 wherein SCI communication is again requested. If, at step 1003, the SCI request is granted, the flow continues to step 1004 wherein the peripheral receives the false address sent by the radiotelephone. The peripheral responds by not acknowledging any further communications on the synchronous data bus. At step 1005, the T and C data lines are set to a logic high state (the idle state) for a period of time determined at step 1006 (greater than one data time). In the idle state the peripheral will not request service on the synchronous data bus. The data bus is not configured for asychronous communication. At step 1007, the peripheral receives an SCI message on the T line while the C line is held in a logic high state. At step 1008, the peripheral determines if it needs to transmits SCI data on the R line. If the determination is negative, the flow returns to step 1005 wherein the bus returns to the idle state. If the determination is positive, the data is sent and the flow continues to step 1009 wherein a determination is made if the SCI communication is complete. If the determination is negative, the flow returns to step 1005 wherein the bus returns to the idle state. If the determination is positive, the flow continues to step 1011 wherein the T and C data lines are set to a logic low state to reset the data bus as a synchronous data bus.

Figure 11:
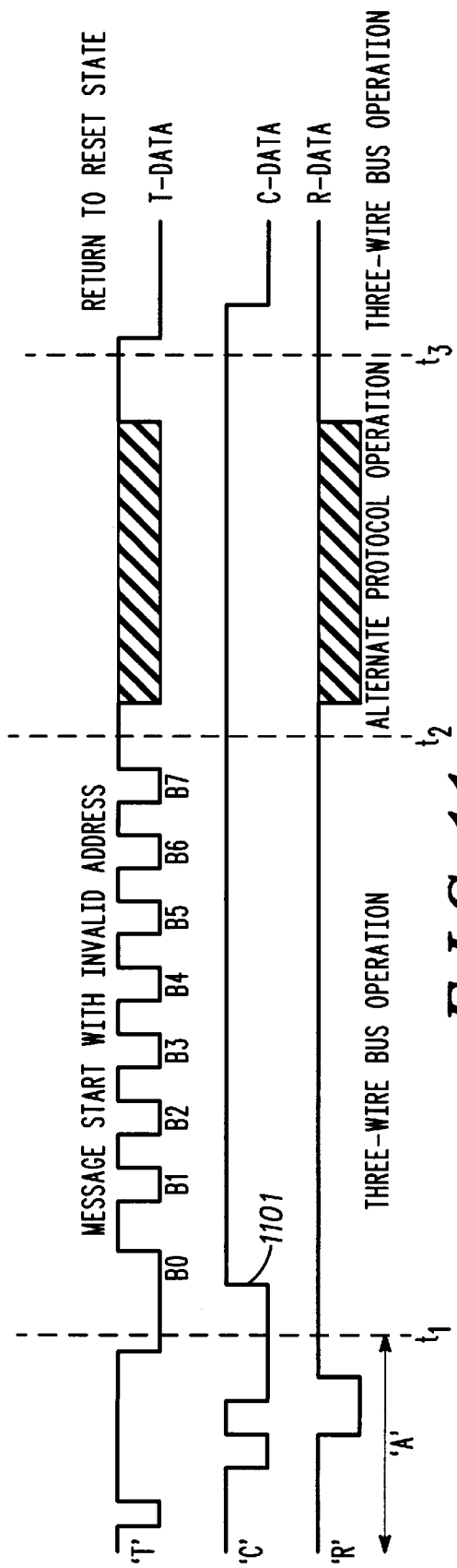
FIG. 11 is a timing diagram of the multiplexed synchronous and asynchronous data appearing on the T, C, and R lines of the bus.

A timing diagram of the activity on the TWB during the process previously described is shown in FIG. 11 Normal TWB operation occurs during the time designated "A". (Both the portable radiotelephone and the converter peripheral have independent TWBs prior to the coupling of the portable and the peripheral. The activity during "A" could be either TWB). Assuming the portable radiotelephone and the converter are plugged together at time "t", the portable processes a power-up sequence after "t1". The TWB activity and any high speed data exchange is dominated by the converter peripheral and the converter peripheral is the "master" for the high speed serial data bus. The microcomputer 736 send a false address to the microcomputer 744. In the preferred embodiment, the false address is "0000" which is the address of the remote unit. Therefore when the microcomputer 736 sends out an address intended for itself no peripherals are capable of responding. This causes all the peripheral to ignore future messages sent from the microcomputer 736 on the synchronous bus during the SCI synchronous data bus communication. The microcomputer 736 then sets the T and C data lines high at time "t2" which places the data bus in the idle state 307 as discussed in FIG. 3. Placing the data bus in the idle state causes the peripherals to not communicate on the synchronous bus during the SCI synchronous data bus communication. The microcomputer 744 will wait at least one data state time duration to be certain that the idle state is recognized as a valid state. The SCI asynchronous communication is performed on the T and R lines. Asynchronous data is sent to the peripheral from the remote unit on the T line and received from the peripheral on the R line. At time "t3" the T. C, and R lines return to synchronous TWB operation when the SCI asychronous messaging is complete by resetting the T and C data lines to a logic low state.

In the preferred embodiment of the present invention, master status and control is passed to the portable radiotelephone at this point if the converter peripheral does not have an auxiliary control unit or telephone handset coupled to it. If the converter peripheral does have such a control unit or handset, the converter retains master status and the control unit of the portable radiotelephone is deactivated as described in aforementioned U.S. Pat. No. 4,680,787.

If the converter peripheral does not include a control unit or handset, a high speed message transferring control to the portable is transmitted to the portable on the R line. The portable, in response to the high speed data message on the R line, confirms and transmits a control message on the T line. The converter microcomputer 744 subsequently releases the C line to the logic low state. All further control is assumed by the portable radiotelephone microcomputer 736 which activates and deactivates the serial high speed data bus. The portable radiotelephone is the master and initiates subsequent communications with any high speed peripherals (including the converter peripheral). Any such peripherals may respond to the communications when their address is part of the communicated message. The release of C line to the logic low state returns the TWB to normal operation.

Figure 12:
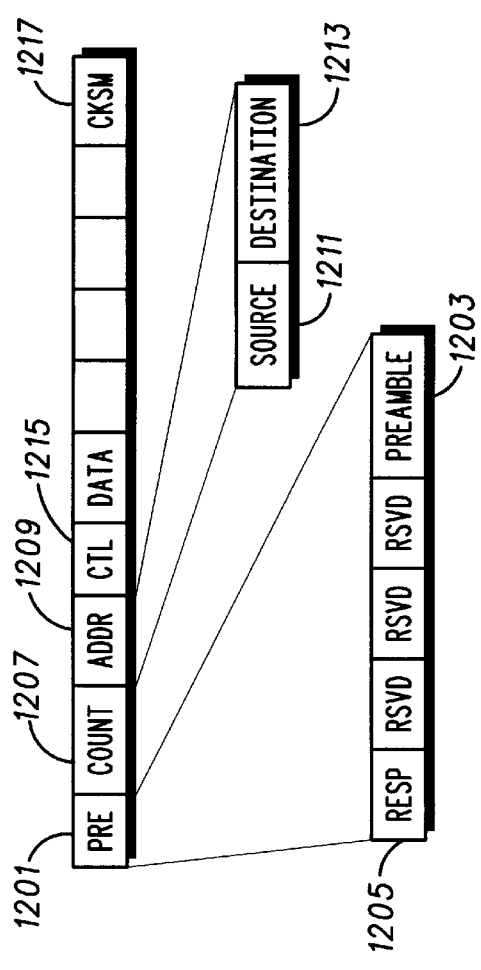
FIG. 12 is a diagram of the asynchronous data packet structure as employed in the present invention.

A diagram of the high speed data message format is illustrated in FIG. 12. A preamble 1201 has a four bit value in the least significant nibble 1203 of the first transmitted byte to provide a synchronization pattern with all devices on the SCI high speed data bus. Additional fields identify the response desired from the addressed unit (1205) and other overhead functions. The count field 1207 provides a count of the total number of data bytes to be transmitted in the packet. The address field 1209 identifies the logical device source 1211 and destination 1213 address fields thus enabling the selective communication with individual devices on the bus. The control field 1215 is used to indicate the defined action or the proper interpretation of the following data field(s). The data field(s) comprise any required data and may be of variable length to include the required data. The checksum field 1217 contains a value that causes a simple sum of all transmitted bytes to equal zero as a method of detecting errors on the bus.

In summary, then, a multiplexed synchronous/asynchronous data bus has been shown and described. This multiplexed data bus utilizes a synchronous self-clocking three line bus for reliable transfer of data at a relatively low data throughput rate. In order to transfer data at a significantly higher data rate, two of the three bus lines are used to carry relatively high speed full-duplex asynchronous serial data messages. To prevent interaction between the low and high rate data, the low speed synchronous data bus is placed in an in-use busy state during the transmission of the asynchronous serial data. Such a multiplexed synchronous/asynchronous data bus is particularly useful for a portable radiotelephone which may be coupled to a vehicle mounted converter supplying power, antenna, radio frequency amplification, and other features to the portable radiotelephone. It is advantageous for the portable radiotelephone to transfer its identification and other operational characteristics to the converter unit at a rapid data rate. Such a multiplexed synchronous/asynchronous data bus is also useful for a portable radiotelephone which may be coupled to a high speed data modem. It is advantageous for the portable radiotelephone to transfer data to the data modem at a rapid data rate.

What is claimed is:

1. A master data device employing a data transmission bus including three communications lines for transmitting a first data message from the master data device to a slave data device at a first rate of data transfer and for transmitting a second data message from the master data device to the slave data device at a second rate of data transfer, each of the two data messages having a plurality of binary bits, each bit having either a binary zero state or a binary one state for a period of time which is related to the data transfer rate, the master data device comprising:

means for applying a first binary state to a first and a second of the three communications lines before and after the first data message;

means for coupling the first data message to the first and second of the three communications lines;

means for coupling a false address of the first data message to the first and the second of the three communications lines;

means for applying a second binary state to the first and the second of the three communications lines after the false address is coupled to the first and the second of the three communications lines; and means for applying the binary bits of the second data message to the second of the three communications lines while the second binary state is applied to the first of the three communications lines.

2. A master data device in accordance with claim 1 wherein the means for coupling the first data message further comprises means for applying, for each bit of the first data message, a second binary state to the first of the three communications lines and the first binary state to the second of the three communications lines during at least part of the time a first data message bit has a binary zero state, and applying the first binary state to the first of the three communications lines and the second binary state to the second of the three communications lines during at least part of the time a first data message bit has a binary one state.

3. A master data device in accordance with claim 2 wherein the means for applying, for each bit of the first data message, a second binary state further comprises means for applying the second binary state to the first and the second of the three communications lines between successive bits of the first data message.

4. A master data device in accordance with claim 1 further comprising means for receiving from the slave data device on the third of the three communications lines a third data message at the second rate of data transfer while the second binary state is applied to the first of the three communications lines.

5. A master data device in accordance with claim 1 further comprising means for successively applying the first binary state to the first and second of the three communications lines following applying the binary bits of the second data message to the second of the three communications lines.

6. A master data device in accordance with claim 4 further comprising means for successively applying the first binary state to the first and second of the three communications lines following receipt of the third data message.

7. A slave data device employing a data transmission bus including three communications lines for receiving a first data message transmitted from a master data device at a first rate of data transfer, for receiving a second data message transmitted from the master data device at a second rate of data transfer, and for communicating a third data message to the master data device, each of the three data messages having a plurality of binary bits, each bit having either a binary zero state or a binary one state for a period of time which is related to the data transfer rate, the slave data device comprising:

means for receiving a first binary state from a first and a second of the three communications lines before and after the first data message;

means for receiving the first data message from the first and second of the three communications lines;

means for coupling at the first rate of data transfer the binary bits of the third data message to a third of the three communications lines;

means for receiving a false address of the first data message from the first and the second of the three communications lines;

means for receiving a second binary state from the first and the second of the three communications lines after the false address is received from the first and the second of the three communications lines; and means for receiving the binary bits of the second data message from the second of the three communications lines while the second binary state is received from the first of the three communications lines.

8. A slave data device in accordance with claim 7 wherein the means for receiving the first data message further comprises means for receiving, for each bit of the first data message, a second binary state from the first of the three communications lines and the first binary state from the second of the three communications lines during at least part of the time a first data message bit has a binary zero state, and receiving the first binary state from the first of the three communications lines and the second binary state from the second of the three communications lines during at least part of the time a first data message bit has a binary one state.

9. A slave data device in accordance with claim 8 wherein the means for receiving, for each bit of the first data message, a second binary state further comprises means for receiving the second binary state from the first and the second of the three communications lines between successive bits of the first data message.

10. A slave data device in accordance with claim 7 further comprising means for communicating to the master data device on the third of the three communications lines a third data message at the second rate of data transfer while the second binary state is applied to the first of the three communications lines.

11. A slave data device in accordance with claim 7 further comprising means for successively receiving the first binary state from the first and second of the three communications lines following receiving the binary bits of the second data message from the second of the three communications lines.

12. A slave data device in accordance with claim 10 further comprising means for successively receiving the first binary state from the first and second of the three communications lines following receipt of the third data message.

13. A data transmission system including three communications lines for communicating a first data message from a first data device to a second data device at a first rate of data transfer, for communicating a second data message from the first data device to the second data device at a second rate of data transfer, and for communicating a third data message from the second data device to the first data device, each of the three data messages having a plurality of binary bits, each bit having either a binary zero state or a binary one state for a period of time which is related to the data transfer rate, the data transmission system comprising:

means, at the first data device, for applying a first binary state to a first and a second of the three communications lines before and after the first data message;

means, at the first data device, for coupling the first data message to the first and second of the three communications lines;

means, at the second data device, for coupling at the first rate of data transfer the binary bits of the third data message to a third of the three communications lines;

means, at the first data device, for coupling a false address of the first data message to the first and the second of the three communications lines;

means, at the first data device, for applying a second binary state to the first and the second of the three communications lines after the false address is coupled to the first and the second of the three communications lines; and means, at the first data device, for applying the binary bits of the second data message to the second of the three communications lines while the second binary state is applied to the first of the three communications lines.

14. A data transmission system in accordance with claim 13 wherein the means, at the first data device, for coupling the first data message further comprises means, at the first data device, for applying, for each bit of the first data message, a second binary state to the first of the three communications lines and the first binary state to the second of the three communications lines during at least part of the time a first data message bit has a binary zero state, and applying the first binary state to the first of the three communications lines and the second binary state to the second of the three communications lines during at least part of the time a first data message bit has a binary one state.

15. A data transmission system in accordance with claim 14 wherein the means for applying, for each bit of the first data message, a second binary state further comprises means, at the first data device, for applying the second binary state to the first and the second of the three communications lines between successive bits of the first data message.

16. A data transmission system in accordance with claim 13 further comprising means, at the first data device, for receiving from the second data device on the third of the three communications lines a third data message at the second rate of data transfer while the second binary state is applied to the first of the three communications lines.

17. A data transmission system in accordance with claim 13 further comprising means, at the first data device, for successively applying the first binary state to the first and second of the three communications lines following applying, at the first data device, the binary bits of the second data message to the second of the three communications lines.

18. A master data device in accordance with claim 16 further comprising means, at the first data device, for successively applying the first binary state to the first and second of the three communications lines following receipt, at the first data device, of the third data message.

19. A portable radiotelephone apparatus employing a data transmission bus including three communications lines for communicating a first data message to a peripheral data device at a first rate of data transfer, for communicating a second data message to the peripheral data device at a second rate of data transfer, and for receiving a third data message from the peripheral data device, each of the three data messages having a plurality of binary bits, each bit having either a binary zero state or a binary one state for a period of time which is related to the data transfer rate, the portable radiotelephone apparatus comprising:

means for applying a first binary state to a first and a second of the three communications lines before and after the first data message;

means for coupling the first data message to the first and second of the three communications lines;

means for receiving from the peripheral data device the binary bits of the third data message at the first rate of data transfer from a third of the three communications lines;

means for coupling a false address of the first data message to the first and the second of the three communications lines;

means for applying a second binary state to the first and the second of the three communications lines after the false address is coupled to the first and the second of the three communications lines;

means for applying the binary bits of the second data message to the second of the three communications lines while the second binary state is applied to the first of the three communications lines; and means for receiving from the peripheral data device the binary bits of the third data message at the second rate of data transfer on the third of the three communications lines while the second binary state is applied to the first of the three communications lines.

20. A peripheral data device employing a data transmission bus including three communications lines for receiving a first data message from a portable radiotelephone apparatus at a first rate of data transfer, for receiving a second data message from the portable radiotelephone apparatus at a second rate of data transfer, and for communicating a third data message to the portable radiotelephone apparatus, each of the three data messages having a plurality of binary bits, each bit having either a binary zero state or a binary one state for a period of time which is related to the data transfer rate, the peripheral data device comprising:

means for receiving a first binary state from a first and a second of the three communications lines before and after the first data message;

means for receiving the first data message from the first and second of the three communications lines;

means for applying the binary bits of the third data message at the first rate of data transfer to a third of the three communications lines;

means for receiving a false address of the first data message from the first and the second of the three communications lines;

means for receiving a second binary state from the first and the second of the three communications lines after the false address is received from the first and the second of the three communications lines;

means for receiving the binary bits of the second data message from the second of the three communications lines while the second binary state is applied to the first of the three communications lines; and means for coupling to the third of the three communications lines a third data message at the second rate of data transfer while the second binary state is applied to the first of the three communications lines.

21. A master data device employing a data transmission bus including three communications lines for transmitting a first data message from the master data device to a slave data device at a first rate of data transfer and for transmitting a second data message from the master data device to the slave data device at a second rate of data transfer, each of the two data messages having a plurality of binary bits, each bit having either a binary zero state or a binary one state for a period of time which is related to the data transfer rate, the master data device comprising:

a data bus controller for:

applying a first binary state to a first and a second of the three communications lines before and after the first data message;

coupling the first data message to the first and second of the three communications lines;

coupling a false address of the first data message to the first and the second of the three communications lines;

applying a second binary state to the first and the second of the three communications lines after the false address is coupled to the first and the second of the three communications lines; and applying the binary bits of the second data message to the second of the three communications lines while the second binary state is applied to the first of the three communications lines.

22. A slave data device employing a data transmission bus including three communications lines for receiving a first data message transmitted from a master data device at a first rate of data transfer, for receiving a second data message transmitted from the master data device at a second rate of data transfer, and for communicating a third data message to the master data device, each of the three data messages having a plurality of binary bits, each bit having either a binary zero state or a binary one state for a period of time which is related to the data transfer rate, the slave data device comprising:

a data bus controller for:

receiving a first binary state from a first and a second of the three communications lines before and after the first data message;

receiving the first data message from the first and second of the three communications lines;

coupling at the first rate of data transfer the binary bits of the third data message to a third of the three communications lines;

receiving a false address of the first data message from the first and the second of the three communications lines;

receiving a second binary state from the first and the second of the three communications lines after the false address is received from the first and the second of the three communications lines; and receiving the binary bits of the second data message from the second of the three communications lines while the second binary state is received from the first of the three communications lines.

23. A master data device employing a data transmission bus that is configured either as a synchronous data transmission bus for transmitting messages from the master data device to a slave data device at a first rate of data transfer or as a asynchronous data transmission bus for transmitting messages from the master data device to the slave data device at a second rate of data transfer, the master data device comprising:

means for communicating the messages on the synchronous data transmission bus to the slave data device;

means for configuring the data transmission bus so that the slave data device ignores further messages on the synchronous data transmission bus;

means for configuring the data transmission bus so that the slave data device does not communicate messages on the synchronous data transmission bus; and means for configuring the data transmission bus as a full-duplex asynchronous data transmission bus for communicating messages between the master data device and the slave data device, wherein the master data device communicates messages to the slave data device on a first communication line of three communication lines of the data transmission bus and wherein the the slave data device communicates messages to the master data device on a second communication line of the three communication lines of the data transmission bus.

24. A slave data device employing a data transmission bus that is configured either as a synchronous data transmission bus for receiving messages transmitted from the master data device to the slave data device at a first rate of data transfer or as a asynchronous data transmission bus for receiving messages transmitted from the master data device to the slave data device at a second rate of data transfer, the slave data device comprising:

means for receiving the first data message on the synchronous data transmission bus transmitted from the master data device;

means for receiving an indication from the master data device to ignore further messages on the synchronous data transmission bus;

means for receiving an indication from the master data device not to communicate messages on the synchronous data transmission bus; and means for configuring the data transmission bus as a full-duplex asynchronous data transmission bus for communicating messages between the master data device and the slave data device, wherein the master data device communicates messages to the slave data device on a first communication line of three communication lines of the data transmission bus and wherein the the slave data device communicates messages to the master data device on a second communication line of the three communication lines of the data transmission bus.

25. A method of data transmission on a data transmission bus including three communications lines for transmitting a first data message from a first data device to a second data device at a first rate of data transfer and for transmitting a second data message from the first data device to the second data device at a second rate of data transfer, each of the two data messages having a plurality of binary bits, each bit having either a binary zero state or a binary one state for a period of time which is related to the data transfer rate, the method of data transmission comprising the steps of:

applying a first binary state to a first and a second of the three communications lines before and after the first data message;

coupling the first data message to the first and second of the three communications lines;

coupling a false address of the first data message to the first and the second of the three communications lines;

applying a second binary state to the first and the second of the three communications lines after the step of coupling false address the first and the second of the three communications lines; and applying the binary bits of the second data message to the second of the three communications lines while the second binary state is applied to the first of the three communications lines.

26. A method of data transmission in accordance with claim 25 wherein the means for coupling the first data message further comprises the steps of applying, for each bit of the first data message, a second binary state to the first of the three communications lines and the first binary state to the second of the three communications lines during at least part of the time a first data message bit has a binary zero state; and applying the first binary state to the first of the three communications lines and the second binary state to the second of the three communications lines during at least part of the time a first data message bit has a binary one state.

27. A method of data transmission in accordance with claim 26 wherein the step of applying, for each bit of the first data message, a second binary state further comprises the step of applying the second binary state to the first and the second of the three communications lines between successive bits of the first data message.

28. A method of data transmission in accordance with claim 25 further comprising the step of receiving from the second data device on the third of the three communications lines a third data message at the second rate of data transfer while the second binary state is applied to the first of the three communications lines.

29. A method of data transmission in accordance with claim 25 further comprising the step of successively applying the first binary state to the first and second of the three communications lines following applying the binary bits of the second data message to the second of the three communications lines.

30. A method of data transmission in accordance with claim 27 further comprising the step of successively applying the first binary state to the first and second of the three communications lines following receipt of the third data message.

31. A method, performed by a master data device, for configuring a data transmission bus as a synchronous data transmission bus for transmitting messages from the master data device to a slave data device at a first rate of data transfer or as a asynchronous data transmission bus for transmitting messages from the master data device to the slave data device at a second rate of data transfer, the method, performed by the master data device, for configuring the data transmission bus comprising the steps of:

communicating the messages on the synchronous data transmission bus to the slave data device;

configuring the data transmission bus so that the slave data device ignores further messages on the synchronous data transmission bus;

configuring the data transmission bus so that the slave data device does not communicate messages on the synchronous data transmission bus; and configuring the data transmission bus as a full-duplex asynchronous data transmission bus for communicating messages between the master data device and the slave data device, wherein the master data device communicates messages to the slave data device on a first communication line of three communication lines of the data transmission bus and wherein the the slave data device communicates messages to the master data device on a second communication line of the three communication lines of the data transmission bus.

32. A method, performed by a slave data device, for configuring a data transmission bus as a synchronous data transmission bus for receiving messages transmitted from a master data device to the slave data device at a first rate of data transfer or as a asynchronous data transmission bus for receiving messages transmitted from the master data device to the slave data device at a second rate of data transfer, the method, performed by the slave data device, for configuring the data transmission bus comprising the steps of:

receiving the first data message on the synchronous data transmission bus transmitted from the master data device;

receiving an indication from the master data device to ignore fuller messages on the synchronous data transmission bus;

receiving an indication from the master data device not to communicate messages on the synchronous data transmission bus; and configuring the data transmission bus as a full-duplex asynchronous data transmission bus for communicating messages between the master data device and the slave data device, wherein the master data device communicates messages to the slave data device on a first communication line of three communication lines of the data transmission bus and wherein the the slave data device communicates messages to the master data device on a second communication line of the three communication lines of the data transmission bus.

* * * * *